(12) United States Patent
Gruener et al.

(10) Patent No.: US 12,619,505 B2
(45) Date of Patent: May 5, 2026

(54) SYSTEM OF AGGREGATING SERVERS

(71) Applicant: ABB Schweiz AG, Baden (CH)

(72) Inventors: Sten Gruener, Laudenbach (DE);
Roland Braun, Niederkassel Lülsdorf
(DE)

(73) Assignee: ABB Schweiz AG, Baden (CH)

( * ) Notice: Subject to any disclaimer, the term of this
patent is extended or adjusted under 35
U.S.C. 154(b) by 40 days.

(21) Appl. No.: 18/632,461

(22) Filed: Apr. 11, 2024

(65) Prior Publication Data

US 2024/0256404 A1 Aug. 1, 2024

Related U.S. Application Data

(63) Continuation of application No.
PCT/EP2022/075867, filed on Sep. 16, 2022.

(30) Foreign Application Priority Data

Oct. 15, 2021 (EP) ..................................... 21202942
Nov. 17, 2021 (EP) ..................................... 21208778

(51) Int. Cl.
*G06F 11/16* (2006.01)
*H04L 9/40* (2022.01)

(52) U.S. Cl.
CPC .......... *G06F 11/1658* (2013.01); *H04L 63/10*
(2013.01); *G06F 2201/805* (2013.01)

(58) Field of Classification Search
CPC .......... G06F 11/1658; G06F 2201/805; H04L
63/10; H04L 67/02; H04L 67/1034;
(Continued)

(56) References Cited

U.S. PATENT DOCUMENTS 11,962,551 B1 * 4/2024 Herrmann ............... H04L 51/07
2006/0028983 A1 * 2/2006 Wright .................. H04L 47/782
370/230
(Continued)

FOREIGN PATENT DOCUMENTS

WO WO 2021/198178 A1 10/2021

OTHER PUBLICATIONS

European Patent Office, Extended European Search Report in
European Patent Application No. 21208778.7, 8 pp. (Nov. 5, 2022).
(Continued)

*Primary Examiner* — Michael Won
(74) *Attorney, Agent, or Firm* — Fitch Even Tabin &
Flannery LLP

(57) ABSTRACT

A system of aggregating servers includes a first aggregating
server that establishes a session for linking with a first
system; a second aggregating server that establishes a ses-
sion linking with a second system; wherein the first and
second aggregating servers replicate mutually structured
data provided by the first and/or second system, to provide
access to the structured data of the respective systems for the
first and second aggregating servers; and coordinate the
respective sessions of the system of aggregating servers with
the first and/or second system to prevent improper access to
the at least first system to be aggregated and/or the at least
second system to be aggregated.

14 Claims, 5 Drawing Sheets

(58) Field of Classification Search
CPC . H04L 67/1095; H04L 67/141; H04L 67/142;
H04L 67/2895; H04L 67/566; H04L
67/1012
See application file for complete search history.

(56) References Cited

U.S. PATENT DOCUMENTS

| | | | | |
|---|---|---|---|---|
| 2007/0027930 | A1* | 2/2007 | Alvarado ................ | H04L 67/04 |
| 2010/0306313 | A1* | 12/2010 | Mahnke ................. | G06F 9/466 |
| | | | | 709/203 |
| 2012/0120962 | A1* | 5/2012 | Li ....................... | H04W 12/069 |
| | | | | 370/401 |
| 2018/0088548 | A1* | 3/2018 | Sangi ..................... | F01K 13/02 |
| 2021/0133183 | A1 | 5/2021 | Biswas et al. | |
| 2022/0179853 | A1* | 6/2022 | Schiekofer ........... | G06F 16/258 |
| 2023/0199570 | A1* | 6/2023 | Lee ....................... | H04W 76/18 |
| | | | | 370/331 |

OTHER PUBLICATIONS

European Patent Office, International Search Report in International Patent Application No. PCT/EP2022/075867, 3 pp. (Jan. 4, 2023). European Patent Office, Written Opinion in International Patent Application No. PCT/EP2022/075867, 4 pp. (Jan. 4, 2023).

* cited by examiner

SYSTEM OF AGGREGATING SERVERS

CROSS-REFERENCE TO RELATED APPLICATIONS

The instant application claims priority to International Patent Application No. PCT/EP2022/075867, filed Sep. 16, 2022; European Patent Application No. 21202942.5, filed Oct. 15, 2021; and European Patent Application No. 21208778.7, filed Nov. 17, 2021, each of which is incorporated herein in its entirety by reference.

FIELD OF THE DISCLOSURE

The present disclosure generally relates to a system and method for aggregating servers and, more particularly, to aggregating Open Platform Communication Unified Architecture (OPC UA) Servers.

BACKGROUND OF THE INVENTION

An aggregating Open Platform Communication Unified Architecture (OPC UA, also standardized as IEC 62541) Server replicates the address space of individual OPC UA Servers providing a consolidated, coherent representation of distributed address spaces on individual OPC UA Servers. An aggregating OPC UA Server can be seen as a proxy for remote individual OPC UA Servers. In the context of integrating small servers, configured for OPC UA connected instrument devices, the Aggregating OPC UA Server can be considered as a kind of an extension cord, since an Aggregating OPC UA Server can handle more concurrent sessions than a small device server can do. Typically, such embedded OPC UA Servers run a maximum of two concurrent sessions. In the context of a distributed control system (DCS) there can be more than two OPC UA Clients to be connected to an instrument device server, wherein the instrument device server can be an individual small embedded OPC UA server.

BRIEF SUMMARY OF THE INVENTION

A single Aggregation OPC UA Server may be a single point of failure causing system-wide impact for e.g. a manufacturing site or other applications. The present disclosure describes systems and methods for aggregating servers. In the present disclosure, the sequence of procedural steps is presented in such a way that the process is easily comprehensible. However, the skilled person will recognize that many of the process steps can also be executed in a different order and lead to the same or a corresponding result. In this sense, the sequence of the process steps can be changed accordingly. Some features are provided with counting words to improve readability or to make the assignment more clear, but this does not imply the presence of certain features.

To achieve these and other advantages and in accordance with the purpose of the invention, as embodied and broadly described herein, there is provided a system of aggregating servers, including a first aggregating server, which is configured to establish a session for communicatively linking with at least one first system to be aggregated and at least a second aggregating server, wherein the second aggregating server is configured to establish a session communicatively linking with at least one second system to be aggregated. Thereby the first aggregating server and the second aggregating server are configured to: replicate mutually structured data provided by the first system to be aggregated and/or the second system to be aggregated, to provide access to the structured data of the respective systems to be aggregated for the first aggregating server and the second aggregating server. Additionally, the first aggregating server and the second aggregating server are configured to coordinate respective sessions of the system of aggregating servers with the at least first system to be aggregated and/or the at least second system to be aggregated, to prevent improper access to the at least first system to be aggregated and/or the at least second system to be aggregated.

The mutually structured data provided by the first system to be aggregated and/or the second system to be aggregated can also be called "address space" or "information model."

A system to be aggregated, can, as an example, be an embedded system and/or an embedded server, which can be defined as a computer system, a combination of a computer processor, computer memory, and input/output peripheral devices, which has a dedicated function within a larger mechanical or electronic system. Such an embedded server can be embedded as part of a complete device including electrical or electronic hardware and mechanical parts. Because an embedded server typically controls physical operations of the machine that it is embedded within, it can have real-time computing constraints. Embedded servers can control a plurality of devices.

A system to be aggregated can be an embedded system, particularly an OPC UA server for connection of OPC UA instrument devices.

BRIEF DESCRIPTION OF THE SEVERAL VIEWS OF THE DRAWING(S)

The accompanying drawings, which are included to provide a further understanding of the invention and are incorporated in and constitute a part of this application, and illustrate embodiments of the disclosure.

DETAILED DESCRIPTION OF THE INVENTION

Figure 1:
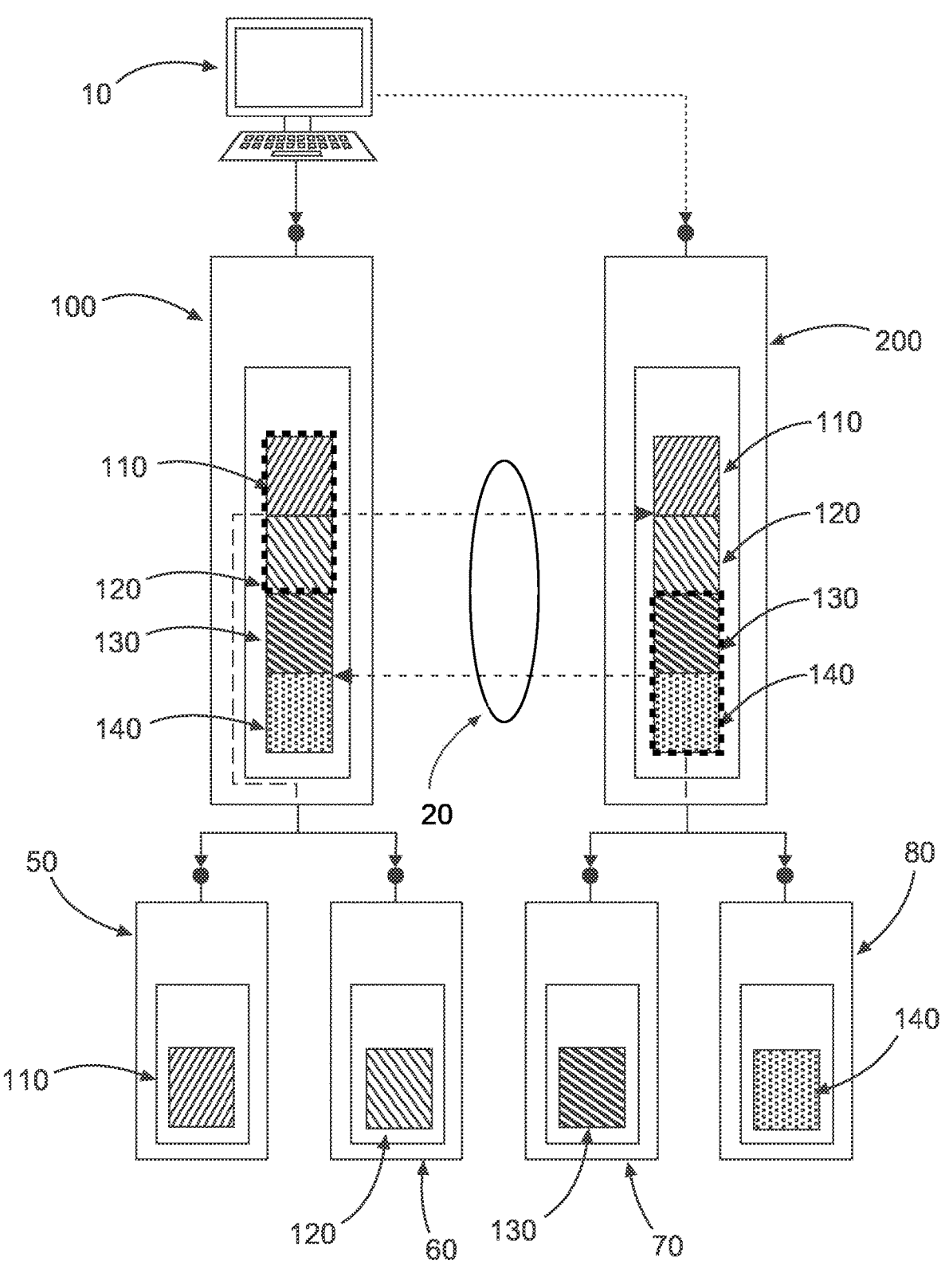
FIG. 1 is a schematic representation of a system of aggregating servers with shared sessions with the systems to be aggregated in operation mode in accordance with the disclosure.

FIG. 1 schematically sketches a system of aggregating servers 100, 200 with shared sessions with the systems to be aggregated 50, 60, 70, 80 in a proper running operation mode of both aggregating servers 100, 200. An external client 10 is coupled for communication with the first aggregating server 100 and the second aggregating server 200.

The coupling for communication with the second aggregating server 200 can be established by providing an address of the second aggregating server 200 to the external client 10 for communicating of the external client 10 with the second aggregating server 200, preferably in case the first aggregating server 100 is not available for communication.

The first aggregating server 100 is coupled for communication with two systems to be aggregated 50, 60 and the second aggregating server 200 is coupled to another pair of systems to be aggregated 70, 80. The systems to be aggregated 50, 60, 70, and 80, are configured to provide structured data 110, 120, 130, 140 respectively. The first aggregating server 100 and the second aggregating server 200 are coupled via a link 20 and both are configured to replicate structured data provided by the systems to be aggregated 50 and 60 which are coupled to the first aggregating server 100 and/or and the structure data provided by the systems to be aggregated 70 and 80, which are coupled to the second aggregating server 200 respectively, to provide access to the structured data of the respective systems to be aggregated 50, 60, 70, 80 for the first aggregating server and the second aggregating server. In this configuration the load corresponding to the systems to be aggregated 50, 60, 70, 80, is balanced between the two aggregating systems 100, 200.

Figure 2:
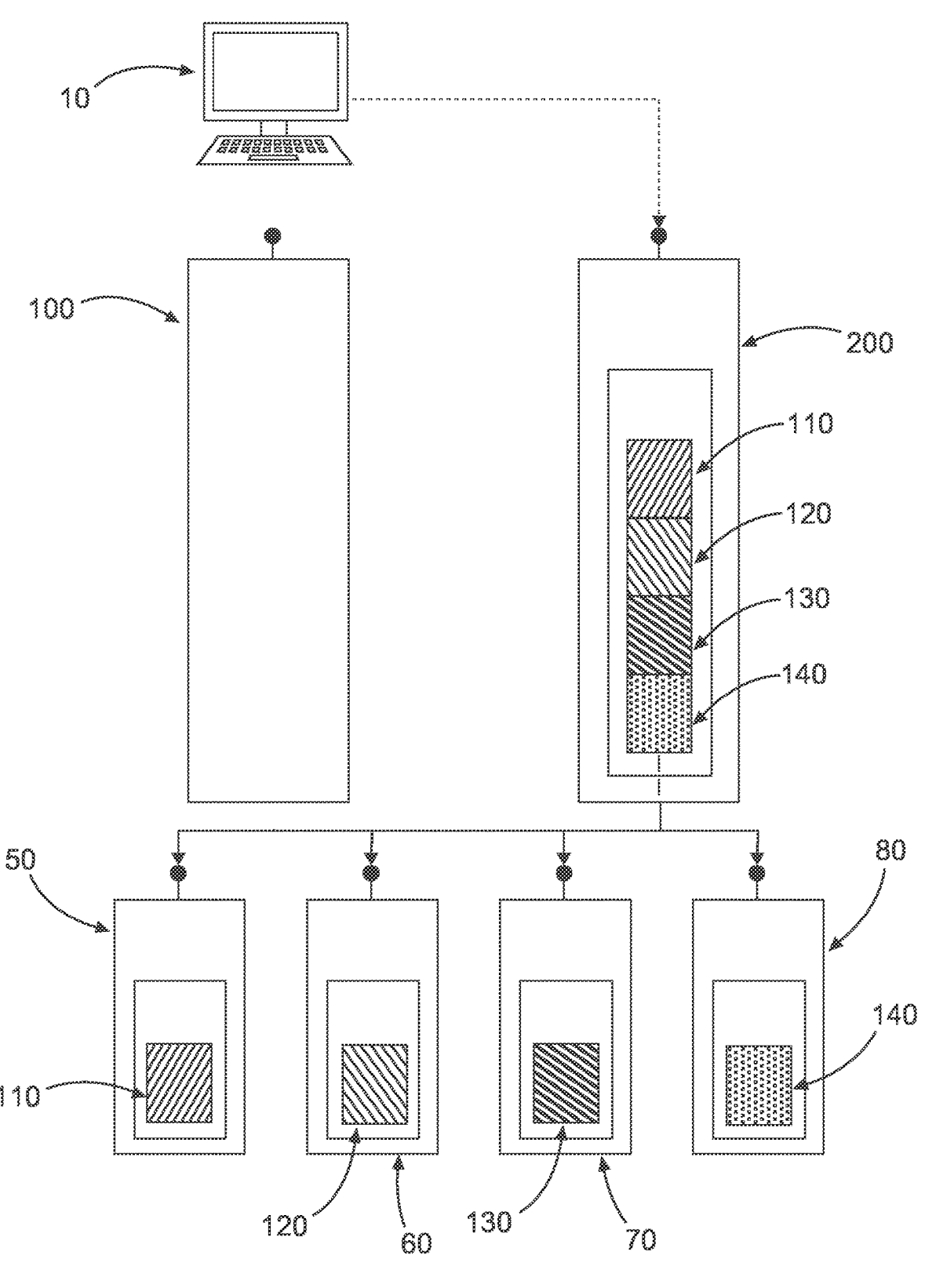
FIG. 2 is a schematic representation of a system of aggregating servers with systems to be aggregated with fail over switching in accordance with the disclosure.

FIG. 2 schematically sketches the system of aggregating servers 100, 200 with systems to be aggregated 50, 60, 70, 80 as described in respect to FIG. 1, after a fail over switching is completed. Starting, for instance, with the configuration of the system of aggregating servers 100, 200 as described in respect to FIG. 1, the redundant second aggregating server 200 is providing the structured data 110, 120, 130, 140 of the systems to be aggregated 50, 60, 70, 80 to the external client 10, because the structured data 110, 120, 130, 140 were already replicated and the coupling for communication with the systems to be aggregated 50, 60, 70, 80 is provided by the second aggregating server 200 to continue the access to the systems to be aggregated 50, 60, 70, 80. Using other words, FIG. 2 illustrates a scenario where a former aggregating server on standby 200 becomes the active aggregating server 200. The former aggregating server on standby 200 took over the coupling for communication of the systems to be aggregated 50 and 60.

Figure 3:
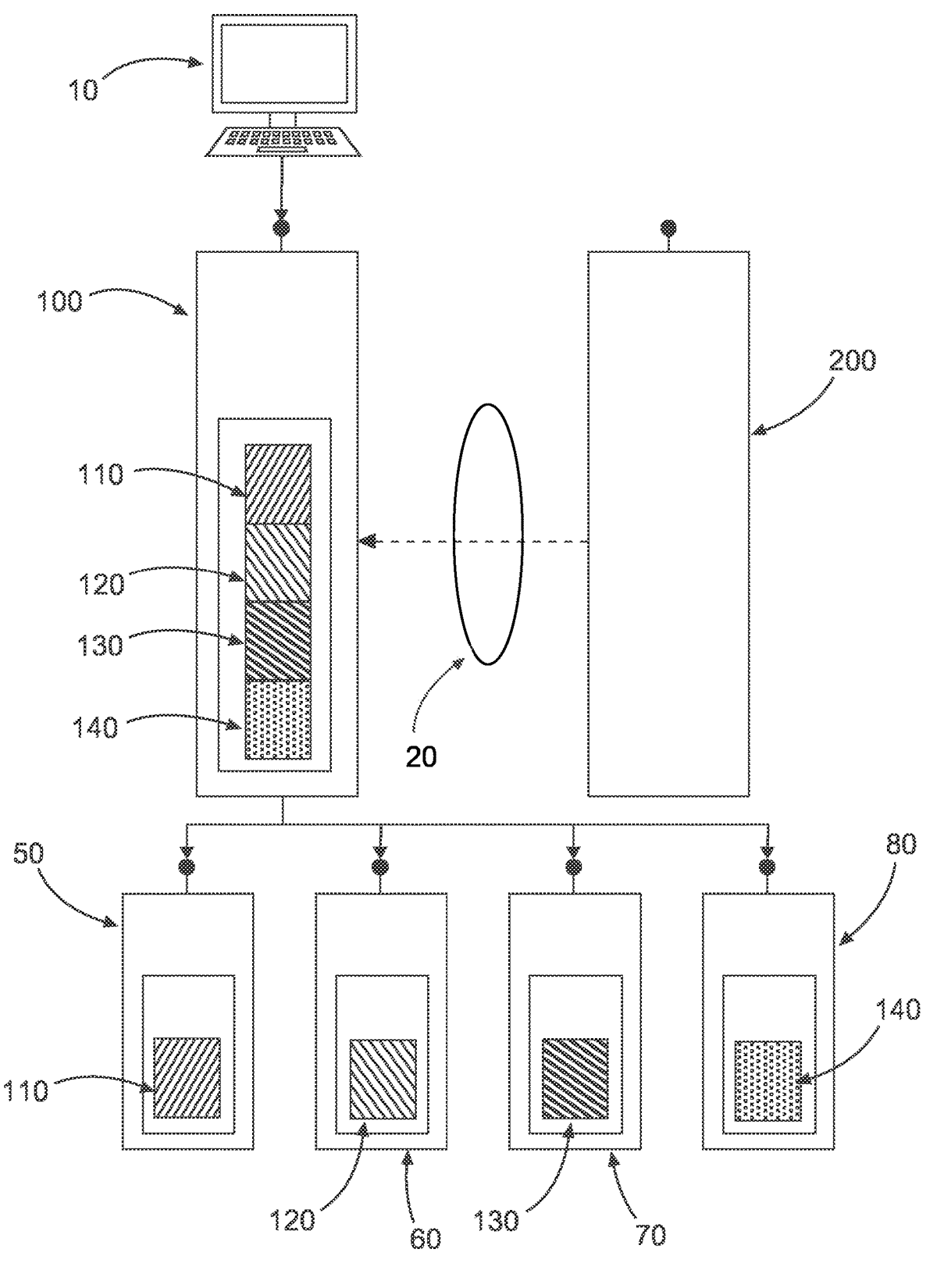
FIG. 3 is a schematic representation of a system of aggregating servers with systems to be aggregated by the first aggregating server in accordance with the disclosure.

FIG. 3 schematically sketches a system of aggregating servers 100, 200 with systems to be aggregated 50, 60, 70, 80 coupled for communication to the first aggregating server 100 only. An additional, particularly redundant, aggregating server 200 can be linked to the first aggregating server 100 to build a system of aggregating servers 100, 200 by coupling to the first aggregating server 100 via a link 20 and replicating the structured data provided by the first system to be aggregated 100. Accordingly further aggregating servers can be integrated to the system of aggregating servers.

Figure 4:
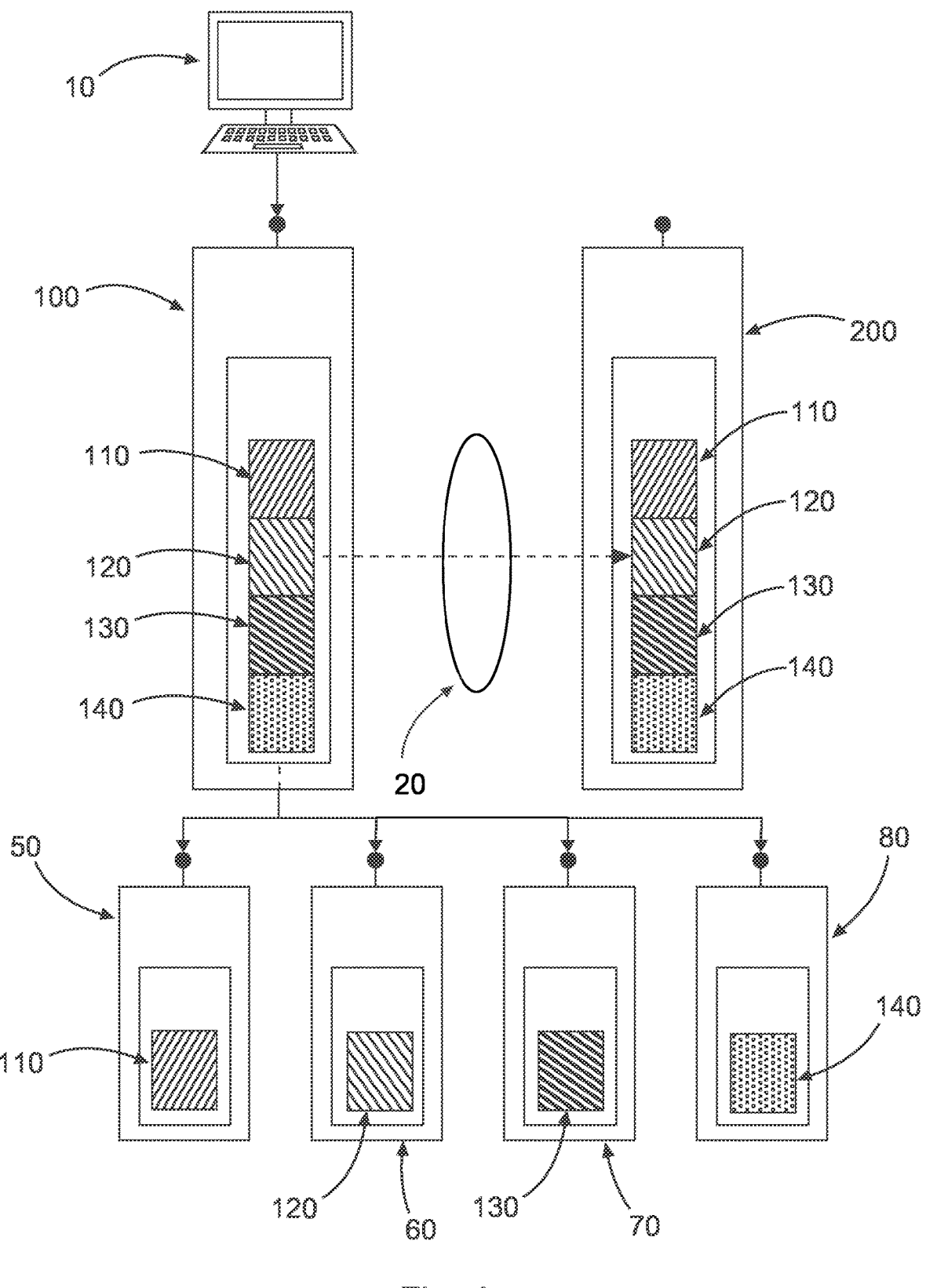
FIG. 4 is a schematic representation of a system of aggregating servers with systems to be aggregated during replication of the structure data in accordance with the disclosure.

FIG. 4 schematically sketches a system of aggregating servers 100, 200 with systems to be aggregated 50, 60, 70, 80 during replication of the structure data 110, 120, 130, 140 from the first aggregating server 100, which is coupled to the systems to be aggregated 50, 60, 70, 80, to the second aggregating server 200, via the link 20 for communication. The second aggregating server 200 is during the replication of the structured data, not coupled to the systems to be aggregated 50, 60, 70, 80, but configured to be coupled to at least a part of the systems to be aggregated 50, 60, 70, 80.

Figure 5:
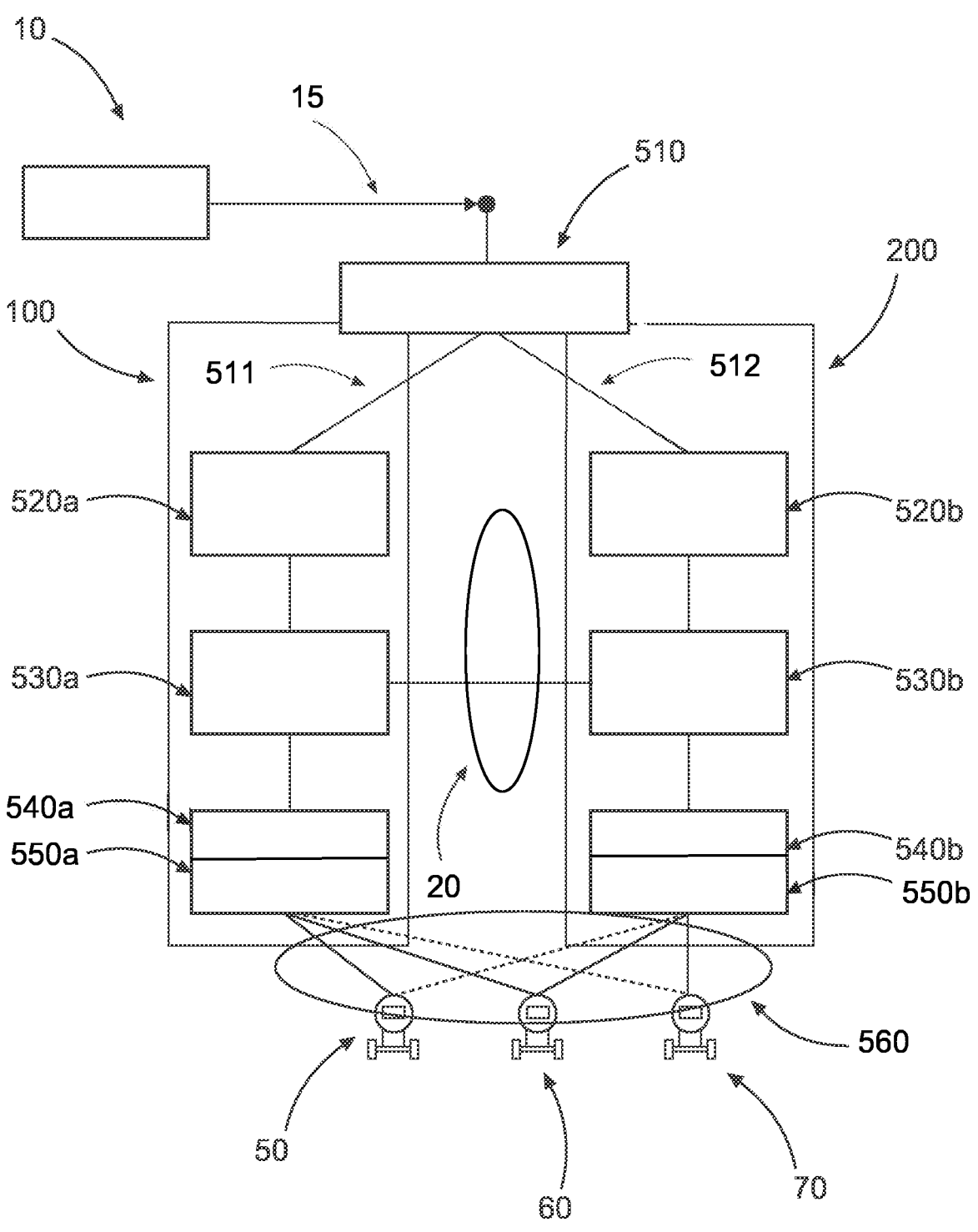
FIG. 5 is a schematic representation of functional blocks of a system of aggregating servers with systems to be aggregated in accordance with the disclosure.

FIG. 5 schematically sketches functional blocks of a system of aggregating servers 100, 200 and systems to be aggregated 50, 60, 70, which are coupled to the system of aggregating servers 100, 200 via a link 560.

An external client 10 is coupled to the system of aggregating servers 100, 200 via a client link 15. The client link 15 couples the external client 10 to a reverse proxy server 510 of the system of aggregating servers 100, 200. The reverse proxy server 510 for load balancing is coupled for communication via an input link 511, 512 to information model servers 520a, 520b of the aggregating servers 100, 200 respectively. The information model servers 520a, 520b, which are configured to provide an aggregated information model, are coupled for communication with databases 530a, 530b of the aggregating servers 100, 200 respectively.

The databases 530a, 530b of the respective aggregating servers 100, 200 are coupled by a link 24 replication of structured data which are provided by the systems to be aggregated 50, 60, 70. Additionally, the databases 530a, 530b of the respective aggregating servers 100, 200, which are configured to store the structured data, are coupled to device connection managers 540a, 540b of the respective aggregating servers 100, 200, which are configured for controlling a policy for establishing a session of the related systems to be aggregated 50, 60, 70 with the related aggregating server 100, 200. And the device connection managers 540a, 540b of the respective aggregating servers 100, 200 are coupled for communication to device clients 550a, 550b of the respective aggregating servers 100, 200, which are configured to enable via the link 560 a session and to run a session with the systems to be aggregated 50, 60, 70.

An OPC UA Server can be an example of a system to be aggregated and provides access to data and functions from embedded systems and/or embedded instruments and/or from systems or subsystems from a variety of devices. A session can be a logic channel between a server, as e.g. a system to be aggregated, and a client, as e.g. an aggregating server, in particular a device client of the aggregating server, wherein structured data, which are communicated within such a session, are communicated in an encrypted form.

Session related information can include keys used to run the secure channel, as for instance assess rights and/or assess information, as e.g. crypto-keys, and/or an information model about the structured data to be exchanged within the session and/or an address space.

The mutual replication of structured data between the aggregating servers can also include status data of each system to be aggregated as well as session configuration data, which are shared between the aggregating servers by replication, whereby the respective aggregating servers have access to this structured data and/or the status data by communication access to the respective system to be aggregated, where a session of the related system to be aggregated with the related aggregating server is established.

According to an aspect, each aggregating server is configured to establish a communication link based on a session, which is established between the respective aggregating server and the respective system to be aggregated.

According to an aspect, the aggregating servers are configured to mutual replicate structured data, wherein the structured data are provided by the respective other aggregating server, via a link established between the respective aggregating servers.

According to an aspect, the aggregating servers are configured to coordinate an establishing of respective sessions with the respective systems to be aggregated, by partitioning a plurality of sessions with the systems to be aggregated and the system of aggregating servers, between the respective aggregating servers of the system of aggregating servers, for load balancing of the sessions and/or to prevent improper access to the at least first system to be aggregated and/or the at least second system to be aggregated.

According to an aspect, the aggregating servers are configured to replicate session related data, as for instance a password and/or to replicate session coordination data, which describe, which aggregating server is communicatively linked to a system to be aggregated based on a session; and/or to replicate status data of the system to be aggregated, as for instance a number of open sessions; and/or whether an individual system to be aggregated of a plurality of systems to be aggregated is idle or operating. According to an aspect, the second aggregating server can be operated as a redundant aggregating server until a failure of the first aggregating server is detected. According to an aspect, it is proposed to mutually replicate structured data and replicate related session configuration data of the systems to be aggregated.

A coupling for communication can enable an information exchange based on signals, which are exchanged by the coupled devices. Using other words, the system of aggregating servers are configured for enablement of lateral communication, particular lateral synchronization, between the at least two aggregating servers, particularly OPC UA servers, because switching of an operation of aggregating server to the second aggregating server, which is configured to be a redundant aggregating server, particular a redundant aggregating OPC UA Server, needs to be prepared for seamless operation.

As a consequence the aggregating servers are communicatively linked to replicate their information for sharing the information between all aggregating servers, particularly if they are configured to be redundant and respectively in standby mode, the aggregating server is needed to be configured to operate such that: each of the aggregating servers have access to a complete configuration setup of the system of aggregating servers, particularly that a current active aggregating server reports any deviation, for example, if at least one of the aggregating servers, which is in standby, fails; the current active aggregating server can be determined: because the complete information is shared among all redundant aggregating servers, such that it is possible that, if an active aggregating server fails, another aggregating server, which is on a stand-by mode, can, based on its known stand-in-priority among the other aggregating servers on standby, determine the aggregating server that is to take over the operation of the prior aggregating server; all information in regard to the current active sessions with systems to be aggregated is shared among all redundant aggregating servers. The redundant aggregating server to take over, will apply the information about current active sessions with systems to be aggregated to manage a bump-free continuation of ongoing sessions. This includes the sessions of the device client of the aggregating server, which is communicating with the systems to be aggregated, as there may be the sessions between the active aggregating server and external clients. Session related information includes the keys used to run a secure channel of communication. Furthermore, a synchronization in terms of active number of sessions is needed to ensure that systems to be aggregated, which are aggregated in the node space of the aggregating server, are not overwhelmed with incoming connection approaches from the aggregating server; all status data of the systems to be aggregated are shared among all redundant aggregating servers. The redundant aggregating servers to take over, will feed current active sessions with up-to-date status data from the systems to be aggregated. A database, which particularly may be configured to be redundant, can be used to share status data of the systems to be aggregated.

This mutual replication, which can be called "lateral synchronization", among redundant aggregating servers can run on encrypted communication, to ensure that the "secure channel" communication between an external client and a system to be aggregated cannot be compromised.

A cycle time of submitted messages to monitor the availability within a communication link can define the needed time to detect a failure. The system can be configured such that a time, needed for the replication, as described above, is shorter than the time, an external client needs to detect a communication breakdown.

Such a replication operation can be used to add an additional aggregating server to extend the system of redundant aggregating servers. The aggregating server for extending the system of aggregating servers, which can be operated in an "off-line"-mode can registers itself at the "active" aggregating server, which in turn can transfer all information for replication, and particularly including an entire aggregated address space, and/or all information about current sessions to the "off-line" aggregating servers and the URLs of those servers to be aggregated the extending aggregating server in "off-line" mode shall become responsible for.

According to an aspect, the first aggregating server is configured to establish respective communication links with a part of a plurality of systems to be aggregated and the at least second aggregating server is configured to establish a communication link with another part of the plurality of systems to be aggregated; and wherein the aggregating servers are configured to coordinate respective sessions for establishing the communication link with the plurality of systems to be aggregated, in such a way, as to prevent improper access to the plurality of systems to be aggregated and/or for load balancing of the sessions.

According to an aspect, the improper access can be caused by exceeding a permitted number of multiple sessions with the systems to be aggregated.

For instance, such an improper access can be an error and/or an overload in respect to a build-up of the respective session.

According to an aspect, each system to be aggregated is configured as a server, particularly for providing structured data.

According to an aspect, each aggregating server is configured to be coupled for communication to a plurality of external client systems.

Based on the system of aggregating servers, external client systems can have a faster access to the structured data of the systems to be aggregated and/or the number of clients, which have access to the structured data of the systems to be aggregated, such that the system of aggregating servers can be scaled to specific needs.

According to an aspect, the respective aggregating server includes an information model server, configured to provide an aggregated information model, which aggregates the information models of each system to be aggregated, which are coupled for communication to the system of aggregating servers. The respective aggregating server also includes a database, configured to store the structured data of the systems to be aggregated, according to an aggregated information model, which is related to the respective systems to be aggregated. The respective aggregating server also includes a device connection manager, configured for controlling a policy for establishing a session of the related systems to be aggregated with the related aggregating server and a device client, configured to enable and run a session with the systems to be aggregated.

The device client is coupled to the database via the device connection manager and configured to be coupled to a plurality of systems to be aggregated. The device connection manager is coupled for communication with the information model server, which is configured to be coupled for communication with an external client.

According to an aspect, the database of each aggregating server is a distributed database. According to an aspect, the system of aggregating servers comprise a reverse proxy server, which is coupled for communication with at least the first aggregating server and the at least second aggregating server for load balancing access for communication of a plurality of external client systems with the reverse proxy server. Such a reverse proxy can include a logic, which decides how the load is balanced among the redundant aggregating OPC UA servers.

Load balancing means that "incoming" external client requests get routed to one of the aggregating servers based on a defined balancing strategy, e.g., round-robin. Advantageously the system of aggregating servers is configured to extend a "simple" fail-over-switching between redundant components including load balancing.

A load balancing can be a logic that decides how the load is balanced among aggregating servers. As an example, a design strategy decision for configuration of the system of aggregating servers can consider the constrained number of sessions the systems to be aggregated can handle. To minimize the number of sessions between redundant aggregating servers and the system to be aggregated, as e.g. an instrument with an embedded server, the system to be aggregated can have only one session with a single aggregating server. This means, the applicable granularity to distribute processing burden is bound to a single system to be aggregated.

Therefore, the load balancing logic can measure the processing effort an aggregating server spends on a single system to be aggregated in respect to a relative amount of time, i.e. a percentage, an aggregating server spends on a single system to be aggregated.

If the first aggregating server of the system of aggregating servers is active and the second aggregating server is in standby mode for redundancy, the active first aggregating server will handle the complete load of the servers to be aggregated, which are linked to the system of aggregating servers. If the second aggregating server is running, to share the burden to handle the communication with the servers to be aggregated, the servers to be aggregated have to be reassigned in such a way, that each aggregating server, preferable handles the same number of servers to be aggregated to balance the load.

If the system of aggregating servers are operated together, which may include, beside the first aggregating server, several further aggregating servers, each of the aggregating servers can normalize the measured load against a common time base, as e.g. a load of 15% in 1 s.

The mutual replication of structured data between, particular redundant, aggregating servers, can include to share session status information including load information for comparison of each of the aggregating servers. Since all aggregating servers run the same algorithm to optimize the load distribution, knowing their stand-in priority, each individual aggregating server can take over or release its task or "responsibility" for any system to be aggregated, to aggregate based on the common knowledge about status and load. In general the optimization method can try that various load distribution scenarios, measures the system load balance for all aggregating servers and finally choose a load distribution scenario with the best load balance, which is the minimum difference between the loads the individual aggregating servers have to manage. In a system with more than two additional, particularly redundant, aggregating servers re-balancing calculations can be repeated if one of the aggregating servers fails. To reduce the time needed to cope with the malfunction of a single aggregating server, all aggregating servers can calculate the distribution scenarios, for a scenario, where one or the other aggregating server disappears, beforehand. If a single aggregating server experiences load changes, according to a present threshold, this aggregating server can re-trigger a load optimization cycle, sharing its current load status immediately.

While, particularly redundant, aggregating servers have negotiated a way of how to share the load of aggregating the systems to be aggregated, additionally a similar list, how to share the load can be used to share the IO-work that is requested by external client systems communicating to "active" redundant aggregating servers only.

In larger systems with many, particularly slower, systems to be integrated the initial aggregation of distributed address space can become time consuming if only a single aggregating server is configured to run an initial aggregation cycle from which other redundant aggregating servers are replicated.

Therefore, any additional, particularly redundant, aggregating server can share this initial effort in a "bootstrap" procedure, because the system of aggregated servers are configured to replicate the structured data. That means, the system of aggregated servers can be configured such that each of the additional, particularly redundant, aggregating servers has access to and shares a complete list of systems to be aggregated, e.g. by means of a list of URLs of the systems to be aggregated. According to the stand-in priority of the additional aggregating servers, a first redundant aggregating server, which is designated to become an "active" one, picks one URL from the list of URL addresses of the systems to be aggregated, replacing the entry with an own URL, finally sharing the modified list with the other redundant aggregating servers. The other redundant aggregating servers immediately have access to the information, which redundant aggregating server picked a system to be aggregated and according to a stand-in priority of the redundant aggregating servers, the next redundant aggregating server will perform the same procedure steps. After a set up time, all systems to be aggregated are identified or "found" and aggregated by one of the additional, particularly redundant, aggregating servers.

By this concept a redundant aggregating server can become "responsible" for a set of systems to be aggregated. At the end of the initial aggregation procedure, the replication of the structured data can ensure that all redundant aggregating servers have access to the structured data provided by the systems to be aggregated. An "active" redundant aggregating server can go online, and is ready to run information exchange with external client systems.

The concept described for the "bootstrap" procedure, described above, can also shoot to boost systems responsiveness. The replication between the aggregating systems is considered a lot faster than a regular communication of the aggregating systems with the systems to be aggregated. While the redundant aggregating servers have negotiated a way of how to share the work of initially aggregating the service to be aggregated on remote, a similar list can be taken to share the computational load hat is requested by external clients communicating with the "active" redundant aggregating server only. While the external client seems to communicate with the entire system, the "active" redundant aggregating server immediately talks to the systems to be aggregated it has initially aggregated. If inbound request refers to data that has been aggregated by an additional, particularly redundant, aggregating server, which can be in a standby mode, a service forwarding layer between the redundant aggregating server triggers the "responsible" of the redundant aggregating servers performing the requested service with the initially aggregated systems to be aggregated; synchronizing the result through the service forwarding layer and the replication, which is about maintaining the status update information for all redundant aggregating servers.

To avoid a single point of failure the switching between the two or more redundant aggregating servers, whereby it is not relevant whether they are configured to aggregate address spaces of other systems to be aggregated, are configured to be processed by the aggregating servers themselves for Fail-Over-Switching including URL Endpoint-Shading. Based on the replication procedure as described above, which can be seen as a first element in a solution to prepare a Fail-Over-Switching, a second element of the technical solution for preparation of a Fail-Over-Switching leverages the way of how the URLs of the systems to be aggregated can be handled during failover.

Any URL of a system to be aggregated refers to a host-address, a port number and optionally to a sub-structured path. The host-address is bound to a host system, particular a computer, where the aggregating server, which may be implemented as a computer program on that host system, resides. Any system to be aggregated communicates via a communication path of the host system.

Whereby the host system can be an electronic device or a virtual machine. Depending on whether the system of aggregating servers is configured to run at redundant aggregating servers on separate machines to provide hardware redundancy or on a single machine to provide software redundancy there are slightly different concepts to manage the URLs endpoints for redundant aggregating servers.

The common part for both situations is, an external client communicating to an "active" aggregating server shall not experience any issues. This means the external client can communicate with the same URL of the system of aggregating servers after a switching between the respective aggregating servers took place. A current session shall remain active, which is prepared by the session status that is shared among redundant aggregating servers.

When running hardware redundancy, the failing aggregating server modifies its MAC- and IP Address to "hide away". In case of a complete hardware breakdown, where no software can be executed, the technical defect "hides" the machine communication-wise.

The "stand-by" aggregating servers can be prepared to take over by using the MAC- and IP Address of the former "active" aggregating server using also the shared session status to continue the ongoing session(s).

In case of software redundancy the treatment of the URLs used by the redundant aggregating servers leaves the host-address unchanged; only the port or any post-fix in the URL, of the system of aggregating servers, changes. In this scenario there is an Endpoint-URL that refers to the current "active" aggregating server. When the software of this "active" aggregating server fails, its URL will respond no more. The aggregating server on "stand-by", can always be synchronized about a session status by a replication procedure, as e.g. an aggregating server may run multiple concurrent sessions to multiple external clients, can take over by changing its URL to the URL of the former "active" aggregating server has used.

According to an aspect, the reverse proxy server is configured to provide a dedicated IP address to decouple each external client system from the first aggregating server and the at least second aggregating server.

According to an aspect, the system of aggregating servers comprises OPC UA aggregating servers.

According to an aspect, the external client system is an OPC UA client system and/or the system to be aggregated is an OPC UA system to be aggregated and/or the information model is an OPC UA information model and/or the device client is an OPC UA device client.

According to an aspect, the first aggregating server and the at least second aggregating server are coupled for communication and the aggregating servers are configured to mutually replicate the structured data provided by the first system to be aggregated and/or the at least second system to be aggregated and respective session configuration data of the systems to be aggregated, to provide access of the structured data and the session configuration data of the respective systems to be aggregated for the first aggregating server and the at least second aggregating server.

The session configuration data can be defined as configuration data of the session and/or policy information of the session.

According to an aspect, the coupling for communication between the first aggregating server and the at least second aggregating server is provided by using encrypted communication.

According to an aspect, the first aggregating server and the at least second aggregating server are coupled for communication to coordinated the mutual distribution of respective distributed sessions to the at least first system to be aggregated and/or the at least second system to be aggregated and/or each aggregating server is configured to respectively store the coordinated mutual distribution of respective distributed sessions with the at least first system to be aggregated and/or the at least second system to be aggregated, to enable the respective aggregating servers to take over at least the sessions of the respective other aggregating server in case of a failure within the system of aggregating servers.

Using other words, each of the aggregating servers have access to the system configuration. The replication using the coupling link between the first aggregating server and the at least second aggregating server can include a number of active sessions with the systems to be aggregated.

According to an aspect, the first aggregating server and the second aggregating server are installed on different hardware computing systems for providing high availability aggregating servers.

According to an aspect, the at least second aggregating server on a second hardware computing system is running in a standby mode until a failure within the system of aggregating servers is detected.

Advantageously, by running the first aggregating server and the second aggregating server on different hardware computing systems can provide redundant aggregating servers for a high availability system, if in case of a failure within one computing system the complete operation of the system of aggregating servers can be provided by a computing system, which was running in a standby mode.

In computing, an address space defines a range of discrete addresses, each of which may correspond to a network host, peripheral device, disk sector, a memory cell or other logical or physical entity.

Round-robin (RR) is one of the algorithms employed by process and network schedulers in computing for load balancing.

All references, including publications, patent applications, and patents, cited herein are hereby incorporated by reference to the same extent as if each reference were individually and specifically indicated to be incorporated by reference and were set forth in its entirety herein.

The use of the terms "a" and "an" and "the" and "at least one" and similar referents in the context of describing the invention (especially in the context of the following claims) are to be construed to cover both the singular and the plural, unless otherwise indicated herein or clearly contradicted by context. The use of the term "at least one" followed by a list of one or more items (for example, "at least one of A and B") is to be construed to mean one item selected from the listed items (A or B) or any combination of two or more of the listed items (A and B), unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

What is claimed is:

1. A system of aggregating servers, comprising:
a first aggregating server configured to establish a session for communicatively linking with at least one first system to be aggregated;
at least a second aggregating server configured to establish a session communicatively linking with at least one second system to be aggregated,
wherein each of the first aggregating server and the second aggregating server comprises:
an information model server configured to provide an aggregated information model, which aggregates the information models of each system to be aggregated, which are coupled for communication to the system of aggregating servers:
a database configured to store the structured data of the systems to be aggregated according to an aggregated information model, which is related to the respective systems to be aggregated;

a device connection manager configured for controlling a policy for establishing a session of the related systems to be aggregated with the related aggregating server; and
a device client configured to enable and run a session with the systems to be aggregated, and
wherein the first aggregating server and the second aggregating server are configured to:
replicate mutually structured data provided by the first system to be aggregated and/or the second system to be aggregated to provide access to the structured data of the respective systems to be aggregated for the first aggregating server and the second aggregating server; and
coordinate the respective sessions of the system of aggregating servers with the at least first system to be aggregated and/or the at least second system to be aggregated to prevent improper access to the at least first system to be aggregated and/or the at least second system to be aggregated.

2. The system of aggregating servers according to claim 1, wherein the first aggregating server is configured to establish respective communication links with a part of a plurality of systems to be aggregated; and the at least second aggregating server is configured to establish a communication link with another part of the plurality of systems to be aggregated; and wherein the aggregating servers are configured to coordinate respective sessions for establishing the communication link with the plurality of systems to be aggregated in such a way as to prevent improper access to the plurality of systems to be aggregated and/or for load balancing of the sessions.

3. The system of aggregating servers according to claim 1, wherein the improper access is caused by exceeding a permitted number of multiple sessions with the systems to be aggregated.

4. The system of aggregating servers according to claim 1, wherein each aggregating server is configured to be coupled for communication to a plurality of external client systems.

5. The system of aggregating servers according claim 4, wherein the system of aggregating servers comprise a reverse proxy server, which is coupled for communication with at least the first aggregating server and the at least second aggregating server for load balancing access for communication of a plurality of external client systems with the reverse proxy server.

6. The system of aggregating servers according to claim 5, wherein the reverse proxy server is configured to provide a dedicated IP address to decouple each external client system from the first aggregating server and the at least second aggregating server.

7. The system of aggregating servers according to claim 1, wherein the system of aggregating servers comprises OPC UA aggregating servers.

8. The system of aggregating servers according to claim 7, wherein the external client system is an OPC UA client system and/or the system to be aggregated is an OPC UA system to be aggregated and/or the information model is an OPC UA information model and/or the device client is an OPC UA device client.

9. The system of aggregating servers according to claim 1, wherein the first aggregating server and the at least second aggregating server are coupled for communication and the aggregating servers are configured to mutually replicate the structured data provided by the first system to be aggregated and/or the at least second system to be aggregated and respective session configuration data of the systems to be aggregated, to provide access of the structured data and the session configuration data of the respective systems to be aggregated for the first aggregating server and the at least second aggregating server.

10. The system of aggregating servers according to claim 9, wherein the coupling for communication between the first aggregating server and the at least second aggregating server is provided by using encrypted communication.

11. The system of aggregating servers according to claim 9, wherein the first aggregating server and the at least second aggregating server are coupled for communication to coordinated the mutual distribution of respective distributed sessions to the at least first system to be aggregated and/or the at least second system to be aggregated.

12. The system of aggregating servers according to claim 11, wherein each aggregating server is configured to respectively store the coordinated mutual distribution of respective distributed sessions with the at least first system to be aggregated and/or the at least second system to be aggregated, to enable the respective aggregating servers to take over at least the sessions of the respective other aggregating server in case of a failure within the system of aggregating servers.

13. The system of aggregating servers according to claim 1, wherein the first aggregating server and the second aggregating server are installed on different hardware computing systems for providing high availability aggregating servers.

14. The system of aggregating servers according to claim 13, wherein the at least second aggregating server on a second hardware computing system is running in a standby mode until a failure within the system of aggregating servers is detected.

* * * * *